(12) United States Patent
Lin et al.

(10) Patent No.: US 11,425,431 B1
(45) Date of Patent: Aug. 23, 2022

(54) EDGE COMPUTING METHOD AND APPARATUS, EDGE DEVICE AND STORAGE MEDIUM

(71) Applicant: SENSETIME INTERNATIONAL PTE. LTD., Singapore (SG)

(72) Inventors: Jinliang Lin, Singapore (SG); Jiacheng Wu, Singapore (SG); Dongliang Sun, Singapore (SG); Shuai Zhang, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 0 days.

(21) Appl. No.: 17/361,739

(22) Filed: Jun. 29, 2021

Related U.S. Application Data

(63) Continuation of application No. PCT/IB2021/054763, filed on May 31, 2021.

(30) Foreign Application Priority Data

May 21, 2021 (SG) .......................... 10202105406W (51) Int. Cl.
*H04N 21/231* (2011.01)
*H04N 21/845* (2011.01)
(Continued)

(52) U.S. Cl.
CPC . *H04N 21/23116* (2013.01); *H04N 21/23418* (2013.01); *H04N 21/252* (2013.01); *H04N 21/8455* (2013.01)

(58) Field of Classification Search
CPC ....... H04N 21/23116; H04N 21/23418; H04N 21/252; H04N 21/8455
See application file for complete search history.

(56) References Cited

U.S. PATENT DOCUMENTS 5,633,999 A * 5/1997 Clowes ................. G06F 11/142
714/40
9,509,798 B1 * 11/2016 Thomas .............. H04L 12/1485
(Continued)

FOREIGN PATENT DOCUMENTS

CN 111062234 A 4/2020
CN 111815675 A 10/2020
(Continued)

OTHER PUBLICATIONS

Machine translation to English for CN111815675A via Google Patents (Year: 2020).*
(Continued)

*Primary Examiner* — Fernando Alcon
(74) *Attorney, Agent, or Firm* — Cooper Legal Group, LLC (57) ABSTRACT

Provided are an edge computing method and apparatus, an edge device and a storage medium. The method includes that: multiple channels of original videos of a target scenario are acquired; synchronous access processing is performed on the multiple channels of original videos to obtain multiple channels of synchronous videos, and multiple frames of synchronous images are acquired based on the multiple channels of synchronous videos; computer vision collaborative analysis is performed on the multiple frames of synchronous images to obtain a collaborative processing result; and service logic processing is performed with configuration information synchronized from a cloud server in advance and corresponding to the target scenario, as well as the collaborative processing result to obtain a service processing result.

18 Claims, 2 Drawing Sheets

(51) Int. Cl.
*H04N 21/25* (2011.01)
*H04N 21/234* (2011.01)

(56) References Cited

U.S. PATENT DOCUMENTS

| | | | |
|---|---|---|---|
| 2012/0287222 | A1 | 11/2012 | Liu |
| 2016/0155126 | A1* | 6/2016 | D'Uva ............. G06Q 20/40145 705/44 |
| 2018/0350191 | A1 | 12/2018 | Shigeta |
| 2021/0281891 | A1* | 9/2021 | Srivastava ............. G06N 20/00 |
| 2021/0394056 | A1* | 12/2021 | Cerny ................ H04N 21/4781 |

FOREIGN PATENT DOCUMENTS

| | | |
|---|---|---|
| CN | 112449152 A | 3/2021 |
| EP | 2525574 A1 | 11/2012 |

OTHER PUBLICATIONS

"Real-Time Human Objects Tracking for Smart Surveillance at the Edge", May 2018, Ronghua Xu, Seyed Yahya Nikouei, Yu Chen, Aleksey Polunchenko, Sejun Song, Chengbin Denge and Timothy R. Faughnan, IEEE International Conference on Communications (ICC), Reprinted from the Internet at: DOI: 10.1109/ICC.2018. 8422970, 6 pgs.

International Search Report in the international application No. PCT/IB2021/054763, dated Sep. 14, 2021, 5 pgs.

Written Opinion of the International Search Authority in the international application No. PCT/IB2021/054763, dated Sep. 14, 2021, 6 pgs.

First Written Opinion of the Singaporean application No. 10202105406W, dated Sep. 13, 2021, 10 pgs.

"Collaborative Multi-object Tracking as an Edge Service using Transfer Learning", Dec. 2020, Han Sun, Yu Chen, Alexander Aved and Erik Blasch, In Proceedings of 2020 IEEE 22nd International Conference on High Performance Computing and Communications; IEEE 18th International Conference on Smart City; IEEE 6th International Conference on Data Science and Systems, pp. 1112-1119.

"Distributed Deep Neural Networks Over the Cloud, the Edge and End Devices", Jun. 2017, Surat Teerapittayanan, Bradley McDanel and H.T. Kung, In Proceedings of 2017 IEEE 37th International Conference on Distributed Computing Systems,pp. 328-339.

"Heterogeneous Edge Computing Open Platforms and Tools for Internet of Things", Jan. 2020, Huansheng Ning, Yunfei Li, Feifei Shi and Laurence T. Yang, Future Generation Computer Systems, vol. 106, pp. 67-76.

First Office Action of the Australian application No. 2021204480, dated Apr. 20, 2022, 6 pgs.

* cited by examiner

EDGE COMPUTING METHOD AND APPARATUS, EDGE DEVICE AND STORAGE MEDIUM

CROSS-REFERENCE TO RELATED APPLICATION

This is continuation application of international application PCT/IB2021/054763, filed on 31 May 2021, which claims priority to Singapore patent application No. 10202105406W, filed with IPOS on 21 May 2021. The contents of international application PCT/IB2021/054763 and Singapore patent application No. 10202105406W are incorporated herein by reference in their entireties.

TECHNICAL FIELD

The present disclosure relates to the technical field of computer vision, and more particularly, to an edge computing control method and apparatus, an edge device and a storage medium.

BACKGROUND

At present, in computer vision applications and particularly in real-time video analysis, an edge device typically pushes an acquired video to a cloud device; and the cloud server operates computer vision algorithms for analysis, and transmits an analysis result to the edge device, such that the edge device outputs and presents the analysis result.

However, the edge device acquires the analysis result through interactions with the cloud server, the process is relatively complex; and the cloud server needs to process a great deal of information to cause large delay and poor timeliness. Furthermore, only single-channel interprocess communication can be implemented, and images for each channel of video are respectively analyzed and processed, so the accuracy is low.

SUMMARY

The embodiments of the present disclosure are intended to provide an edge computing method and apparatus, an edge device and a storage medium.

The technical solutions in the embodiments of the present disclosure are implemented as follows.

The embodiments of the present disclosure provide an edge computing method, which is applied to an edge device, and includes the following operations.

Multiple channels of original videos of a target scenario are acquired.

Synchronous access processing is performed on the multiple channels of original videos to obtain multiple channels of synchronous videos, and multiple frames of synchronous images are acquired based on the multiple channels of synchronous videos.

Computer vision collaborative analysis is performed on the multiple frames of synchronous images to obtain a collaborative processing result.

Service logic processing is performed with configuration information synchronized from a cloud server in advance and corresponding to the target scenario, as well as the collaborative processing result to obtain a service processing result.

In the above method, the operation that the multiple frames of synchronous images are acquired based on the multiple channels of synchronous videos includes the following operations.

Images at a same moment are acquired from the multiple channels of synchronous videos to obtain multiple frames of to-be-processed images.

Each frame of image among the multiple frames of to-be-processed images is preprocessed to obtain the multiple frames of synchronous images.

In the above method, the operation that the computer vision collaborative analysis is performed on the multiple frames of synchronous images to obtain the collaborative processing result includes the following operations.

Computer vision analysis is performed on each frame of image among the multiple frames of synchronous images to obtain multiple image processing results in one-to-one correspondence with the multiple frames of synchronous images.

Fusion and/or duplication eliminating are performed on the multiple image processing results to obtain the collaborative processing result.

In the above method, the operation that the computer vision analysis is performed on each frame of image among the multiple frames of synchronous images to obtain the multiple image processing results in the one-to-one correspondence with the multiple frames of synchronous images includes the following operations.

Feature information of a target object is extracted from a first synchronous image, the first synchronous image being any image among the multiple frames of synchronous images.

A first image processing result corresponding to the first synchronous image is determined based on the feature information, the multiple image processing results including the first image processing result.

In the above method, the operation that the first image processing result corresponding to the first synchronous image is determined based on the feature information includes the following operations.

A feature information library in the cloud server is acquired.

Feature information matching with the feature information is searched from the feature information library.

Information associated with the found feature information in the feature information library is determined as the first image processing result.

In the above method, after the service logic processing is performed with the collaborative processing result to obtain the service processing result, the method further includes the following operation.

The service processing result is sent to an output device, to output prompt information for the target scenario through the output device based on the service processing result.

In the above method, after the service logic processing is performed with the configuration information synchronized from the cloud server in advance and corresponding to the target scenario, as well as the collaborative processing result to obtain the service processing result, the method further includes the following operation.

The service processing result is sent to the cloud server, for data analysis on the cloud server with the service processing result.

In the above method, in a case of multiple edge devices, multiple service processing results are provided correspondingly, and after the service logic processing is performed with the configuration information synchronized from the cloud server in advance and corresponding to the target scenario, as well as the collaborative processing result to obtain the service processing result, the method further includes the following operation.

The multiple service processing results are sent to the cloud server, for data analysis on the cloud server with the multiple service processing results.

In the above method, after the service logic processing is performed with the configuration information synchronized from the cloud server in advance and corresponding to the target scenario, as well as the collaborative processing result to obtain the service processing result, the method further includes the following operations.

The service processing result is stored in a case where the cloud server is in a fault state.

The analysis processing result is sent to the cloud server in a case where the cloud server is converted from the fault state into a normal state.

In the above method, after the synchronous access processing is performed on the multiple channels of original videos to obtain the multiple channels of synchronous videos, the method further includes the following operations.

The multiple channels of synchronous videos are encoded to one channel of video to obtain an encoded video.

The encoded video is sent to a video storage device at a same network segment with the edge device for storage.

In the above method, after the service logic processing is performed with the configuration information synchronized from the cloud server in advance and corresponding to the target scenario, as well as the collaborative processing result to obtain the service processing result, the method further includes the following operation.

A play link corresponding to the encoded video is acquired, and the play link is written into the service processing result.

The embodiments of the present disclosure provide an edge computing apparatus, which is applied to an edge device, and includes: an image acquisition module, a vision analysis module and a service processing module.

The image acquisition module is configured to acquire multiple channels of original videos of a target scenario; and perform synchronous access processing on the multiple channels of original videos to obtain multiple channels of synchronous videos, and acquire multiple frames of synchronous images based on the multiple channels of synchronous videos.

The vision analysis module is configured to perform computer vision collaborative analysis on the multiple frames of synchronous images to obtain a collaborative processing result.

The service processing module is configured to perform service logic processing with configuration information synchronized from a cloud server in advance and corresponding to the target scenario, as well as the collaborative processing result to obtain a service processing result.

In the above apparatus, the image acquisition module is specifically configured to acquire images at a same moment from the multiple channels of synchronous videos to obtain multiple frames of to-be-processed images; and preprocess each frame of image among the multiple frames of to-be-processed images to obtain the multiple frames of synchronous images.

In the above apparatus, the vision analysis module is specifically configured to perform computer vision analysis on each frame of image among the multiple frames of synchronous images to obtain multiple image processing results in one-to-one correspondence with the multiple frames of synchronous images; and perform fusion and/or duplication eliminating on the multiple image processing results to obtain the collaborative processing result.

In the above apparatus, the vision analysis module is specifically configured to extract feature information of a target object from a first synchronous image, the first synchronous image being any image among the multiple frames of synchronous images; and determine a first image processing result corresponding to the first synchronous image based on the feature information, the multiple image processing results including the first image processing result.

In the above apparatus, the vision analysis module is specifically configured to acquire a feature information library in the cloud server; search feature information matching with the feature information from the feature information library; and determine information associated with the found feature information in the feature information library as the first image processing result.

In the above apparatus, the service processing module is further configured to send the service processing result to an output device, to output prompt information for the target scenario through the output device based on the service processing result.

In the above apparatus, the service processing module is further configured to send the service processing result to the cloud server, for data analysis on the cloud server with the service processing result.

In the above apparatus, in a case of multiple edge devices, multiple service processing results are provided correspondingly.

The service processing module is further configured to send the multiple service processing results to the cloud server, for data analysis on the cloud server with the multiple service processing results.

In the above apparatus, the service processing module is further configured to store the service processing result in a case where the cloud server is in a fault state; and send the analysis processing result to the cloud server in a case where the cloud server is converted from the fault state into a normal state.

In the above apparatus, the image acquisition module is further configured to encode the multiple channels of synchronous videos to one channel of video to obtain an encoded video; and send the encoded video to a video storage device at a same network segment with the edge device for storage.

In the above apparatus, the service processing module is further configured to acquire a play link corresponding to the encoded video, and write the play link into the service processing result.

The embodiments of the present disclosure provide an edge device, which may include: a central processor, a graphics processor, a memory and a communication bus.

The communication bus is configured to implement connection and communication among the central processor, the graphics processor and the memory.

The central processor and the graphics processor are configured to execute one or more programs stored in the memory, to implement the above edge computing method.

The embodiments of the present disclosure provide a computer-readable storage medium, which stores one or more programs; and the one or more programs may be executed by one or more processors, to implement the above edge computing method.

The embodiments of the present disclosure provide the edge computing method, which is applied to the edge device, and includes that: multiple channels of original videos of a target scenario are acquired; synchronous access processing is performed on the multiple channels of original videos to obtain multiple channels of synchronous videos, and multiple frames of synchronous images are acquired based on the multiple channels of synchronous videos; computer vision collaborative analysis is performed on the multiple frames of synchronous images to obtain a collaborative processing result; and service logic processing is performed with configuration information synchronized from a cloud server in advance and corresponding to the target scenario, as well as the collaborative processing result to obtain a service processing result. The edge computing method provided by the embodiments of the present disclosure collaborates multiple channels of videos through the edge device for information processing, and thus improves the timeliness and accuracy of the information processing.

DETAILED DESCRIPTION

A clear and complete description on the technical solutions in the embodiments of the present disclosure will be given below, in combination with the accompanying drawings in the embodiments of the present disclosure.

The embodiments of the present disclosure provide an edge computing method. The executive body may be an edge device. For example, the edge computing method may be executed by a terminal device or a server or other electronic devices. The terminal device may be User Equipment (UE), a mobile device, a user terminal, a terminal, a cell phone, a cordless phone, a Personal Digital Assistant (PDA), a handheld device, a computing device, a vehicle-mounted device, a wearable device, etc. In some possible implementation modes, the edge computing method may be implemented by enabling a processor to call a computer-readable instruction stored in a memory.

Figure 1:
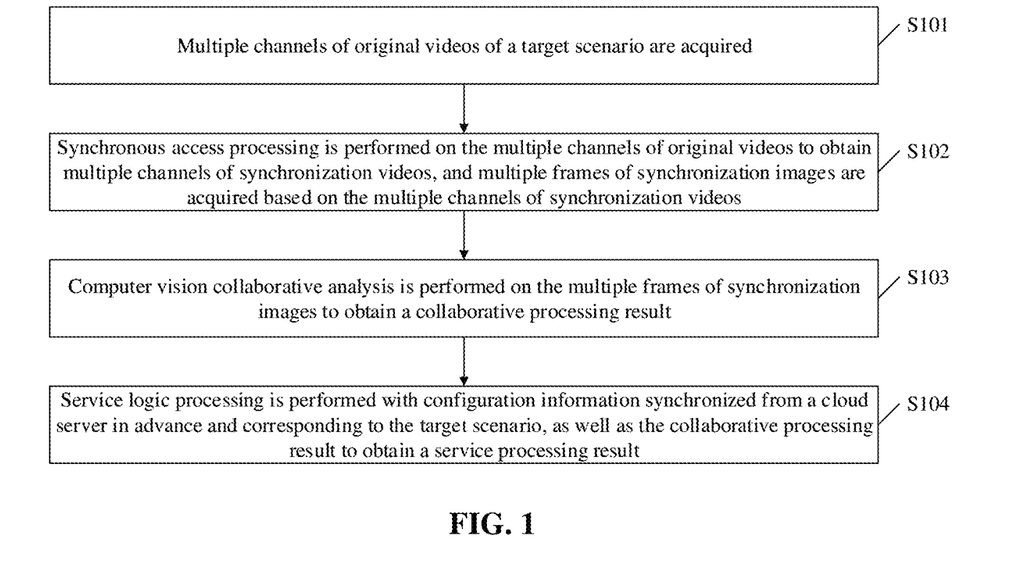
FIG. 1 is a flowchart schematic diagram of an edge computing method provided by an embodiment of the present disclosure.

FIG. 1 is a flowchart schematic diagram of an edge computing method provided by an embodiment of the present disclosure. As shown in FIG. 1, in the embodiment of the present disclosure, the edge computing method mainly includes the following steps.

In S101, multiple channels of original videos of a target scenario are acquired.

In the embodiment of the present disclosure, the edge device may acquire the multiple channels of original videos of the target scenario.

It is to be noted that, in the embodiment of the present disclosure, the target scenario may be any specific scenario, for example, a specific region including some game table may serve as the target scenario. The specific target scenario may be determined according to an actual demand, which is not limited by the embodiment of the present disclosure.

It is to be noted that, in the embodiment of the present disclosure, the edge device may be provided with multiple network interfaces, with each network interface connected to one photographing apparatus, thereby implementing communication and interaction with multiple photographing apparatuses. Among the multiple photographing apparatuses, each photographing apparatus may acquire one channel of original video of the target scenario, i.e., a video at one angle, and transmits the video to the edge device. In this way, the edge device may acquire the multiple channels of videos of the target scenario.

It is to be noted that, in the embodiment of the present disclosure, the specific number of original videos that are acquired by the edge device may be set according to an actual demand and application scenario, which is not limited by the embodiment of the present disclosure.

In S102, synchronous access processing is performed on the multiple channels of original videos to obtain multiple channels of synchronous videos, and multiple frames of synchronous images are acquired based on the multiple channels of synchronous videos.

In the embodiment of the present disclosure, after acquiring the multiple channels of original videos, the edge device may perform the synchronous access processing on the multiple channels of original videos to obtain the multiple channels of synchronous videos, and acquire the multiple frames of synchronous images based on the multiple channels of synchronous videos.

It is to be understood that, in the embodiment of the present disclosure, there may be a certain error between different videos in time among the multiple channels of original videos. Hence, the edge device may perform the synchronous access processing on the multiple channels of original videos, and then may synchronously take frames of the multiple channels of original videos, thereby ensuring that the time error between the acquired videos is controlled within a relatively small range; and, the edge device further uses a frame drop policy to eliminate the accumulated time error in time, such that the multiple channels of synchronous videos obtained finally keep synchronous. Certainly, the edge device may further process the multiple channels of original videos in other modes that implement video synchronization, to obtain the multiple channels of synchronous videos, which is not limited by the embodiment of the present disclosure.

Specifically, in the embodiment of the present disclosure, the step that the edge device acquires the multiple frames of synchronous images based on the multiple channels of synchronous video includes that: images at the same moment are acquired from the multiple channels of synchronous videos to obtain multiple frames of to-be-processed images; and each frame of image among the multiple frames of to-be-processed images is preprocessed to obtain the multiple frames of synchronous images.

It is to be noted that, in the embodiment of the present disclosure, the multiple channels of synchronous videos keep synchronous; the edge device may directly acquire the images at the same moment from the multiple channels of synchronous videos, and takes the acquired each frame of image as one to-be-processed image to obtain the multiple frames of to-be-processed images; and thereafter, the edge device may preprocess each frame of to-be-processed image with a specific image processing mode to obtain the corresponding multiple frames of synchronous images.

It is to be noted that, in the embodiment of the present disclosure, the step that the edge device preprocesses the multiple frames of to-be-processed images may include that: processing such as demosaicing and denoising is performed on the multiple frames of to-be-processed images, such that information presented by the image is more accurate. The specific image processing mode may be set according to an actual demand, which is not limited by the embodiment of the present disclosure.

In S103, computer vision collaborative analysis is performed on the multiple frames of synchronous images to obtain a collaborative processing result.

In the embodiment of the present disclosure, after acquiring the multiple frames of synchronous images, the edge device may perform the computer vision collaborative analysis on the multiple frames of synchronous images to obtain the collaborative processing result.

Specifically, in the embodiment of the present disclosure, the step that the edge device performs the computer vision collaborative analysis on the multiple frames of synchronous images to obtain the collaborative processing result includes that: computer vision analysis is performed on each frame of image among the multiple frames of synchronous images to obtain multiple image processing results in one-to-one correspondence with the multiple frames of synchronous images; and fusion and/or duplication eliminating are performed on the multiple image processing results to obtain the collaborative processing result.

It is to be noted that, in the embodiment of the present disclosure, a graphics processor may be deployed in the edge device, such that the edge device may execute a computer vision algorithm through the graphics processor, to implement the computer vision analysis on the images.

It is to be understood that, in the embodiment of the present disclosure, the edge device performs the computer vision analysis on the multiple frames of synchronous images, which may include that: processing such as object detection, tracking and recognition is executed; and the image processing results for the multiple frames of synchronous images are further combined together, and processing such as cross-camera fusion and duplication eliminating is performed. Therefore, the obtained collaborative processing result can accurately characterize related information of the target scenario at the visual angle. In addition, the image processing mode executed by the edge device on each frame among the multiple frames of synchronous images, and the mode in which the multiple image processing results are combined may be set according to an actual demand, which is not limited by the embodiment of the present disclosure.

Specifically, in the embodiment of the present disclosure, the step that the edge device performs the computer vision analysis on each frame of image among the multiple frames of synchronous images to obtain the multiple image processing results in the one-to-one correspondence with the multiple frames of synchronous images includes that: feature information of a target object is extracted from a first synchronous image, the first synchronous image being any image among the multiple frames of synchronous images; and a first image processing result corresponding to the first synchronous image is determined based on the feature information, the multiple image processing results including the first image processing result.

Specifically, in the embodiment of the present disclosure, the step that the edge device determines the first image processing result corresponding to the first synchronous image based on the feature information includes that: a feature information library in the cloud server is acquired; feature information matching with the feature information of the target object is searched from the feature information library; and information associated with the found feature information in the feature information library is determined as the first image processing result.

It is to be noted that, in the embodiment of the present disclosure, the edge device may communicate and interact with the cloud server, and thus may synchronize the feature information in the cloud server locally. In this way, when the edge device performs the computer vision analysis on the multiple frames of synchronous images, the information associated with the target object in the image may be acquired with the feature information library.

It is to be understood that, in the embodiment of the present disclosure, the image processing result corresponding to each frame of image among the multiple frames of synchronous images may include identity information of each person in the image, etc. The feature information library may store a correspondence between different face feature information and identity information. For any image, i.e., the first synchronous image, among the multiple frames of synchronous images, the edge device may take any person as the target object, directly extract face feature information of the person, match the face feature information with the face feature information in the feature information library, and thus determine identity information associated with the found face feature information as the corresponding image processing result.

It is to be understood that, in the embodiment of the present disclosure, the cloud server may continuously extract features of persons and objects of the target scenario. Hence, after the edge device acquires the feature information library, after obtaining new feature information, the cloud server may continuously transmit the new feature information and associated information thereof to the edge device, such that the edge device may update the feature information library. In addition, in a case where the cloud server is in a fault state, the cloud server cannot extract new feature information, and the edge device also cannot synchronize the information by this time. In view of this, after restored to a normal state, the cloud server may provide new feature information and associated information during the fault state to the edge device.

In S104, service logic processing is performed with configuration information synchronized from a cloud server in advance and corresponding to the target scenario, as well as the collaborative processing result to obtain a service processing result.

In the embodiment of the present disclosure, after acquiring the collaborative processing result corresponding to the multiple frames of synchronous images, the edge device may perform the service logic processing with the configuration information synchronized from the cloud server in advance and corresponding to the target scenario, as well as the collaborative processing result to obtain the service processing result.

It is to be noted that, in the embodiment of the present disclosure, the step that the edge device performs the service logic processing with the configuration information synchronized from the cloud server in advance and corresponding to the target scenario, as well as the collaborative processing result may include that: according to the collaborative processing result in combination with the configuration information, whether the target scenario has a specific person with an abnormal behavior, and whether the target scenario has a specific object with an abnormal movement or change are determined, and a to-be-executed affair is determined. The specific service logic processing mode may be set according to an actual demand, which is not limited by the embodiment of the present disclosure.

It is to be noted that, in the embodiment of the present disclosure, the configuration information synchronized by the edge device from the cloud server in advance and corresponding to the target scenario may include information to be used by the service logic analysis in the target scenario, for example, the target scenario is the board game scenario, and the configuration information may include a game table type, different divided regions, related information on the different regions, information of a player capable of participating in the game, a game rule and the like in the board game scenario. The specific configuration information is not limited by the embodiment of the present disclosure.

In the embodiment of the present disclosure, after obtaining the service processing result, the edge device may further execute the following step: the service processing result is sent to an output device, so as to output prompt information through the output device based on the service processing result.

It is to be noted that, in the embodiment of the present disclosure, the output device may be a client for the target scenario. The edge device may send the service processing result to the client, such that the client may timely output, based on the service processing result, corresponding prompt information to prompt a user. In addition, the client may further communicate and interact with an independent feedback device. In this way, some information in the service processing result may also be fed back to the user through the feedback device.

In the embodiment of the present disclosure, after obtaining the service processing result, the edge device may further execute the following step: the service processing result is sent to the cloud server, such that the cloud server performs data analysis with the service processing result.

It is to be noted that, in the embodiment of the present disclosure, in a case of multiple edge devices, multiple service processing results are provided correspondingly; and the multiple edge devices may send the multiple service processing results to the cloud server, such that the cloud server performs the data analysis in combination with the multiple service processing results.

It is to be understood that, in the embodiment of the present disclosure, multiple edge devices may be provided. Each edge device may synchronously output the service processing result to the cloud server, so it may be ensured that the cloud server can combine data of different edge devices together for analysis to obtain more complete and comprehensive information.

It is to be noted that, in the embodiment of the present disclosure, after obtaining the service processing result, the edge device may further execute the following steps: the service processing result is stored in a case where the cloud server is in a fault state; and the analysis processing result is sent to the cloud server in a case where the cloud server is converted from the fault state into a normal state.

It is to be noted that, in the embodiment of the present disclosure, the edge device may persist the service processing result locally in the case where the cloud server is in the fault state, and then continuously send the service processing result after the cloud server is converted from the fault state into the normal state, so it may be ensured that the cloud server can subsequently continue to use the service processing result for data processing.

In the embodiment of the present disclosure, after performing the synchronous access processing on the multiple channels of original videos to obtain the multiple channels of synchronous videos, the edge device may further execute the following steps: the multiple channels of synchronous videos are encoded to one channel of video to obtain an encoded video; and the encoded video is sent to a video storage device at the same network segment with the edge device for storage. In addition, after performing the service logic processing with the collaborative processing result to obtain the service processing result, the edge device may further execute the following step: a play link corresponding to the encoded video is acquired, and the play link is written into the service processing result.

It is to be understood that, in the embodiment of the present disclosure, as the edge device acquires multiple channels of synchronous videos, in order to view the video conveniently, the edge device encodes three channels of synchronous videos to one channel of video, so as to obtain the encoded video, and thus sends the encoded video to the video storage device at the same network segment for storage, such that the video is called and viewed subsequently at any time. In addition, by writing the play link into the service processing result, the output device may directly output the play link to be played by the user on demand.

Figure 2:
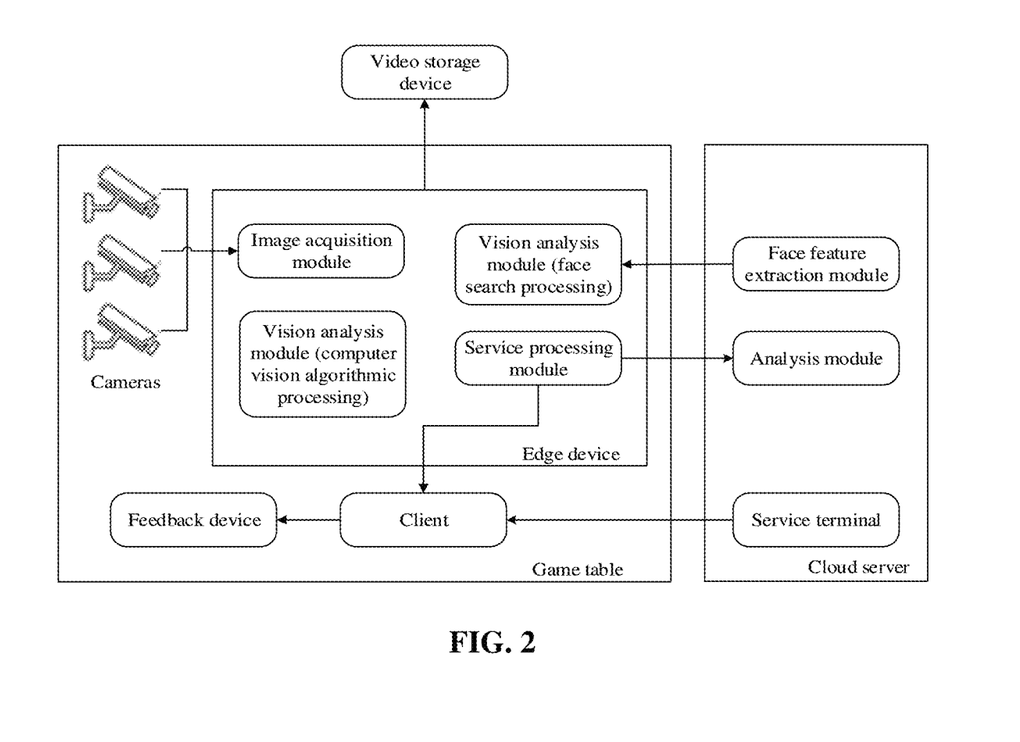
FIG. 2 is a schematic diagram of an exemplary real-time video processing system provided by an embodiment of the present disclosure.

FIG. 2 is a schematic diagram of an exemplary real-time video processing system provided by an embodiment of the present disclosure. As shown in FIG. 2, the real-time video processing system includes an edge device, a cloud server, three cameras, a feedback device, a client and a video storage device. The edge device, the three cameras, the feedback device and the client are all arranged on the same game table. The edge device may be provided with an image acquisition module, a vision analysis module and a service processing module. The image acquisition module may access the three cameras to obtain three channels of original videos of a target scenario, perform synchronous access processing to obtain three channels of synchronous videos, then preprocess three frames of synchronous images, input the images to the vision analysis module for computer vision collaborative analysis; and output a collaborative processing result to the service processing module, so as to perform service logic processing and obtain a service processing result. The computer vision module includes a computer vision algorithmic processing part and a face search processing part. The computer vision algorithmic processing part may implement computer vision analysis on each frame of image among the multiple frames of synchronous images, and combine all processing results to obtain a collaborative processing result. The computer vision algorithmic processing part may extract face feature information from each frame of synchronous image. The face search processing part may acquire a face feature library from a face feature extraction module of the cloud server, and search information matching with the extracted face feature information from the face feature library, thereby determining identity information of a person to be provided to the computer vision algorithmic processing part for collaborative processing. In addition, the edge device interacts with the video storage device. The video storage device receives and stores the encoded video sent from the edge device for the three channels of synchronous videos.

It is to be noted that, in the embodiment of the present disclosure, as shown in FIG. 2, the service processing module may interact with the analysis module included in the cloud server, such that the service processing result is synchronized to the cloud server, and the cloud server may use the service processing result for data analysis. In addition, the client communicates and interacts with the service terminal of the cloud server, and the service processing module and the feedback device of the edge device, and may receive the service processing result output from the service processing module, thereby outputting prompt information, or outputting the prompt information through the feedback device, and receiving information provided by the service terminal, etc.

The embodiment of the present disclosure provides the edge computing method, which is applied to the edge device, and includes that: multiple channels of original videos of a target scenario are acquired; synchronous access processing is performed on the multiple channels of original videos to obtain multiple channels of synchronous videos, and multiple frames of synchronous images are acquired based on the multiple channels of synchronous videos; computer vision collaborative analysis is performed on the multiple frames of synchronous images to obtain a collaborative processing result; and service logic processing is performed with configuration information synchronized from a cloud server in advance and corresponding to the target scenario, as well as the collaborative processing result to obtain a service processing result. The edge computing method provided by the embodiment of the present disclosure collaborates multiple channels of videos through the edge device for information processing, and thus improves the timeliness and accuracy of the information processing.

Figure 3:
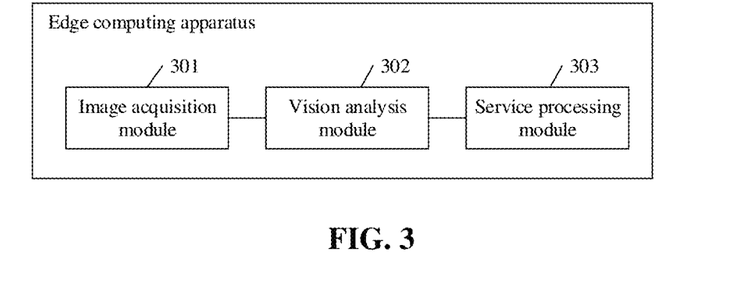
FIG. 3 is a structural schematic diagram of an edge computing apparatus provided by an embodiment of the present disclosure.

The embodiments of the present disclosure further provide an edge computing apparatus. FIG. 3 is a structural schematic diagram of an edge computing apparatus provided by an embodiment of the present disclosure. As shown in FIG. 3, the edge computing apparatus includes an image acquisition module 301, a vision analysis module 302 and a service processing module 303.

The image acquisition module 301 is configured to acquire multiple channels of original videos of a target scenario; and perform synchronous access processing on the multiple channels of original videos to obtain multiple channels of synchronous videos, and acquire multiple frames of synchronous images based on the multiple channels of synchronous videos.

The vision analysis module 302 is configured to perform computer vision collaborative analysis on the multiple frames of synchronous images to obtain a collaborative processing result.

The service processing module 303 is configured to perform service logic processing with configuration information synchronized from a cloud server in advance and corresponding to the target scenario, as well as the collaborative processing result to obtain a service processing result.

In an embodiment of the present disclosure, the image acquisition module 301 is specifically configured to acquire images at the same moment from the multiple channels of synchronous videos to obtain multiple frames of to-be-processed images; and preprocess each frame of image among the multiple frames of to-be-processed images to obtain the multiple frames of synchronous images.

In an embodiment of the present disclosure, the vision analysis module 302 is specifically configured to perform computer vision analysis on each frame of image among the multiple frames of synchronous images to obtain multiple image processing results in one-to-one correspondence with the multiple frames of synchronous images; and perform fusion and/or duplication eliminating on the multiple image processing results to obtain the collaborative processing result.

In an embodiment of the present disclosure, the vision analysis module 302 is specifically configured to extract feature information of a target object from a first synchronous image, the first synchronous image being any image among the multiple frames of synchronous images; and determine a first image processing result corresponding to the first synchronous image based on the feature information, the multiple image processing results including the first image processing result.

In an embodiment of the present disclosure, the vision analysis module 302 is specifically configured to acquire a feature information library in the cloud server; search feature information matching with the feature information from the feature information library; and determine information associated with the found feature information in the feature information library as the first image processing result.

In an embodiment of the present disclosure, the service processing module 303 is further configured to send the service processing result to an output device, so as to output prompt information for the target scenario through the output device based on the service processing result.

In an embodiment of the present disclosure, the service processing module 303 is further configured to send the service processing result to the cloud server, such that the cloud server performs data analysis with the service processing result.

In an embodiment of the present disclosure, in a case of multiple edge devices, multiple service processing results are provided correspondingly.

The service processing module 303 is further configured to send the multiple service processing results to the cloud server, such that the cloud server performs data analysis with the multiple service processing results.

In an embodiment of the present disclosure, the service processing module 303 is further configured to store the service processing result in a case where the cloud server is in a fault state; and send the analysis processing result to the cloud server in a case where the cloud server is converted from the fault state into a normal state.

In an embodiment of the present disclosure, the image acquisition module 301 is further configured to encode the multiple channels of synchronous videos to one channel of video to obtain an encoded video; and send the encoded video to a video storage device at the same network segment with the edge device for storage.

The service processing module 303 is further configured to acquire a play link corresponding to the encoded video, and write the play link into the service processing result.

The edge computing apparatus provided by the embodiment of the present disclosure acquires multiple channels of original videos of a target scenario; performs synchronous access processing on the multiple channels of original videos to obtain multiple channels of synchronous videos, and acquires multiple frames of synchronous images based on the multiple channels of synchronous videos; performs computer vision collaborative analysis on the multiple frames of synchronous images to obtain a collaborative processing result; and performs service logic processing with configuration information synchronized from a cloud server in advance and corresponding to the target scenario, as well as the collaborative processing result to obtain a service processing result. The edge computing apparatus provided by the embodiment of the present disclosure collaborates multiple channels of videos through the edge device for information processing, and thus improves the timeliness and accuracy of the information processing.

Figure 4:
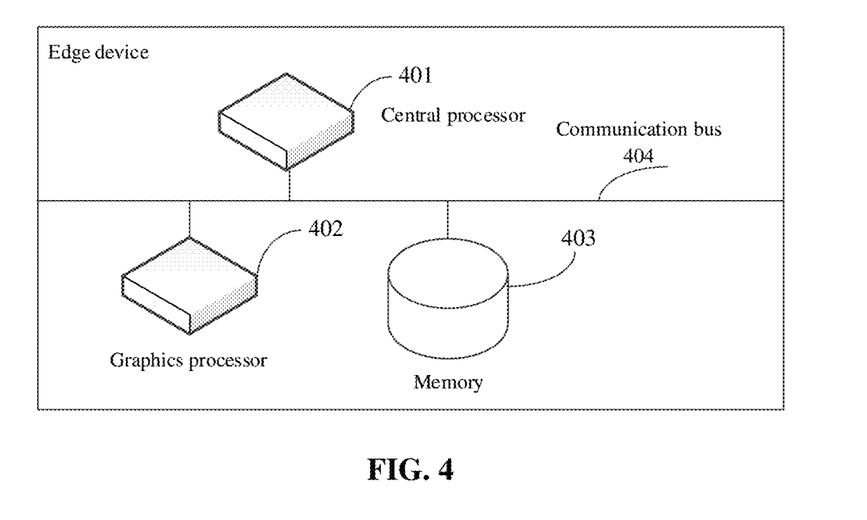
FIG. 4 is a structural schematic diagram of an edge device provided by an embodiment of the present disclosure.

FIG. 4 is a structural schematic diagram of an edge device provided by an embodiment of the present disclosure. As shown in FIG. 4, in the embodiment of the present disclosure, the edge device includes a central processor 401, a graphics processor 402, a memory 403 and a communication bus 404.

The communication bus 404 is configured to implement connection and communication among the central processor 401, the graphics processor 402 and the memory 403.

The central processor 401 and the graphics processor 402 are configured to execute one or more programs stored in the memory 403, to implement the above edge computing method.

The embodiments of the present disclosure further provide a computer-readable storage medium, which stores one or more programs; and the one or more programs may be executed by one or more processors, to implement the edge computing method. The computer-readable storage may be a volatile memory such as a Random-Access Memory (RAM), or a non-volatile memory such as a Read-Only Memory (ROM), a flash memory, a Hard Disk Drive (HDD) or a Solid-State Drive (SSD), or may be a device including any one or combination of the above memories, such as a mobile phone, a computer, a tablet device and a PDA.

Those skilled in the art should understand that the embodiments of the present disclosure can provide a method, a system or a computer program product. Thus, forms of hardware embodiments, software embodiments or embodiments integrating software and hardware can be adopted in the present disclosure. Moreover, a form of the computer program product implemented on one or more computer available storage media (including, but not limited to, a disk memory, an optical memory and the like) containing computer available program codes can be adopted in the present disclosure.

The present disclosure is described with reference to flowcharts and/or block diagrams of the method, the device (system) and the computer program product according to the embodiments of the present disclosure. It should be understood that each flow and/or block in the flowcharts and/or the block diagrams and a combination of the flows and/or the blocks in the flowcharts and/or the block diagrams can be realized by computer program instructions. These computer program instructions can be provided for a general computer, a dedicated computer, an embedded processor or processors of other programmable data processing devices to generate a machine, so that an apparatus for realizing functions assigned in one or more flows of the flowcharts and/or one or more blocks of the block diagrams is generated via instructions executed by the computers or the processors of the other programmable data processing devices.

These computer program instructions can also be stored in a computer-readable memory capable of guiding the computers or the other programmable data processing devices to work in a specific mode, so that a manufactured product including an instruction apparatus is generated via the instructions stored in the computer-readable memory, and the instruction apparatus realizes the functions assigned in one or more flows of the flowcharts and/or one or more blocks of the block diagrams.

These computer program instructions can also be loaded to the computers or the other programmable data processing devices, so that processing realized by the computers is generated by executing a series of operation steps on the computers or the other programmable devices, and therefore the instructions executed on the computers or the other programmable devices provide a step of realizing the functions assigned in one or more flows of the flowcharts and/or one or more blocks of the block diagrams.

The above are merely preferred embodiments of the present disclosure, rather than a limit to the protection scope of the present disclosure.

What is claimed is:

1. An edge computing method, applied to an edge device, and comprising:
   acquiring multiple channels of original videos of a target scenario;
   performing synchronous access processing on the multiple channels of original videos to obtain multiple channels of synchronous videos, and acquiring multiple frames of synchronous images based on the multiple channels of synchronous videos;
   performing computer vision collaborative analysis on the multiple frames of synchronous images to obtain a collaborative processing result; and
   performing service logic processing with configuration information synchronized from a cloud server in advance and corresponding to the target scenario, as well as the collaborative processing result to obtain a service processing result;
   wherein performing the computer vision collaborative analysis on the multiple frames of synchronous images to obtain the collaborative processing result comprises:
      performing computer vision analysis on each frame of image among the multiple frames of synchronous images to obtain multiple image processing results in one-to-one correspondence with the multiple frames of synchronous images; and
      performing one of duplication eliminating or both fusion and duplication eliminating on the multiple image processing results to obtain the collaborative processing result.

2. The method of claim 1, wherein acquiring the multiple frames of synchronous images based on the multiple channels of synchronous videos comprises:
   acquiring images at a same moment from the multiple channels of synchronous videos to obtain multiple frames of to-be-processed images; and
   preprocessing each frame of image among the multiple frames of to-be-processed images to obtain the multiple frames of synchronous images.

3. The method of claim 1, wherein performing the computer vision analysis on each frame of image among the multiple frames of synchronous images to obtain the multiple image processing results in the one-to-one correspondence with the multiple frames of synchronous images comprises:
   extracting feature information of a target object from a first synchronous image, wherein the first synchronous image is any image among the multiple frames of synchronous images; and
   determining a first image processing result corresponding to the first synchronous image based on the feature information, wherein the multiple image processing results comprises the first image processing result.

4. The method of claim 3, wherein determining the first image processing result corresponding to the first synchronous image based on the feature information comprises:
   acquiring a feature information library in the cloud server;
   searching feature information matching with the feature information from the feature information library; and
   determining information associated with the found feature information in the feature information library as the first image processing result.

5. The method of claim 1, after performing the service logic processing with the collaborative processing result to obtain the service processing result, further comprising:

sending the service processing result to an output device, to output prompt information for the target scenario through the output device based on the service processing result.

6. The method of claim 1, after performing the service logic processing with the configuration information synchronized from the cloud server in advance and corresponding to the target scenario, as well as the collaborative processing result to obtain the service processing result, further comprising:
    sending the service processing result to the cloud server, for data analysis on the cloud server with the service processing result.

7. The method of claim 1, wherein in a case of multiple edge devices, multiple service processing results are provided correspondingly, and after performing the service logic processing with the configuration information synchronized from the cloud server in advance and corresponding to the target scenario, as well as the collaborative processing result to obtain the service processing result, the method further comprises:
    sending the multiple service processing results to the cloud server, for data analysis on the cloud server with the multiple service processing results.

8. The method of claim 1, after performing the service logic processing with the configuration information synchronized from the cloud server in advance and corresponding to the target scenario, as well as the collaborative processing result to obtain the service processing result, further comprising:
    storing the service processing result in a case where the cloud server is in a fault state; and
    sending the service processing result to the cloud server in a case where the cloud server is converted from the fault state into a normal state.

9. The method of claim 1, after performing the synchronous access processing on the multiple channels of original videos to obtain the multiple channels of synchronous videos, further comprising:
    encoding the multiple channels of synchronous videos to one channel of video to obtain an encoded video; and
    sending the encoded video to a video storage device at a same network segment with the edge device for storage.

10. The method of claim 9, after performing the service logic processing with the configuration information synchronized from the cloud server in advance and corresponding to the target scenario, as well as the collaborative processing result to obtain the service processing result, further comprising:
    acquiring a play link corresponding to the encoded video, and writing the play link into the service processing result.

11. An edge device, comprising: a central processor, a graphics processor, a memory and a communication bus, wherein
    the communication bus is configured to implement connection and communication among the central processor, the graphics processor and the memory;
    the central processor and the graphics processor are configured to execute one or more programs stored in the memory, to implement following steps:
        acquiring multiple channels of original videos of a target scenario;
        performing synchronous access processing on the multiple channels of original videos to obtain multiple channels of synchronous videos, and acquiring multiple frames of synchronous images based on the multiple channels of synchronous videos;
        performing computer vision collaborative analysis on the multiple frames of synchronous images to obtain a collaborative processing result; and
        performing service logic processing with configuration information synchronized from a cloud server in advance and corresponding to the target scenario, as well as the collaborative processing result to obtain a service processing result;
    wherein for the step of performing the computer vision collaborative analysis on the multiple frames of synchronous images to obtain the collaborative processing result, the central processor and the graphics processor are configured to implement following steps:
        performing computer vision analysis on each frame of image among the multiple frames of synchronous images to obtain multiple image processing results in one-to-one correspondence with the multiple frames of synchronous images; and
        performing one of duplication eliminating or both fusion and duplication eliminating on the multiple image processing results to obtain the collaborative processing result.

12. The edge device of claim 11, wherein for the step of acquiring the multiple frames of synchronous images based on the multiple channels of synchronous videos, the central processor and the graphics processor are configured to implement following steps:
    acquiring images at a same moment from the multiple channels of synchronous videos to obtain multiple frames of to-be-processed images; and
    preprocessing each frame of image among the multiple frames of to-be-processed images to obtain the multiple frames of synchronous images.

13. The edge device of claim 11, wherein for the step of performing the computer vision analysis on each frame of image among the multiple frames of synchronous images to obtain the multiple image processing results in the one-to-one correspondence with the multiple frames of synchronous images, the central processor and the graphics processor are configured to implement following steps:
    extracting feature information of a target object from a first synchronous image, wherein the first synchronous image is any image among the multiple frames of synchronous images; and
    determining a first image processing result corresponding to the first synchronous image based on the feature information, wherein the multiple image processing results comprises the first image processing result.

14. The edge device of claim 13, wherein for the step of determining the first image processing result corresponding to the first synchronous image based on the feature information, the central processor and the graphics processor are configured to implement following steps:
    acquiring a feature information library in the cloud server;
    searching feature information matching with the feature information from the feature information library; and
    determining information associated with the found feature information in the feature information library as the first image processing result.

15. The edge device of claim 11, after the step of performing the service logic processing with the collaborative processing result to obtain the service processing result, the central processor and the graphics processor are further configured to implement a following step:

sending the service processing result to an output device, to output prompt information for the target scenario through the output device based on the service processing result.

16. The edge device of claim 11, after the step of performing the service logic processing with the configuration information synchronized from the cloud server in advance and corresponding to the target scenario, as well as the collaborative processing result to obtain the service processing result, the central processor and the graphics processor are further configured to implement a following step:

sending the service processing result to the cloud server, for data analysis on the cloud server with the service processing result.

17. The edge device of claim 11, wherein in a case of multiple edge devices, multiple service processing results are provided correspondingly, and after performing the service logic processing with the configuration information synchronized from the cloud server in advance and corresponding to the target scenario, as well as the collaborative processing result to obtain the service processing result, the central processor and the graphics processor are further configured to implement a following step:

sending the multiple service processing results to the cloud server, for data analysis on the cloud server with the multiple service processing results.

18. A non-transitory computer-readable storage medium, storing one or more programs, wherein the one or more programs are executable by one or more processors to:

acquire multiple channels of original videos of a target scenario;

perform synchronous access processing on the multiple channels of original videos to obtain multiple channels of synchronous videos, and acquiring multiple frames of synchronous images based on the multiple channels of synchronous videos;

perform computer vision collaborative analysis on the multiple frames of synchronous images to obtain a collaborative processing result; and perform service logic processing with configuration information synchronized from a cloud server in advance and corresponding to the target scenario, as well as the collaborative processing result to obtain a service processing result;

wherein the step of performing the computer vision collaborative analysis on the multiple frames of synchronous images to obtain the collaborative processing result comprises:

performing computer vision analysis on each frame of image among the multiple frames of synchronous images to obtain multiple image processing results in one-to-one correspondence with the multiple frames of synchronous images; and performing one of duplication eliminating or both fusion and duplication eliminating on the multiple image processing results to obtain the collaborative processing result.

* * * * *